(12) United States Patent
Ferencz et al.

(10) Patent No.: US 10,526,460 B2
(45) Date of Patent: Jan. 7, 2020

(54) COMPOSITIONS COMPRISING A FIBER MATERIAL AND A THERMOPLASTIC BINDER

(71) Applicant: Henkel AG & Co. KGaA, Duesseldorf (DE)

(72) Inventors: Andreas Ferencz, Duesseldorf (DE); Olaf Lammerschop, Krefeld (DE); Tamara Schmidt, Oberhausen (DE); Andrew Slark, Berkshire (GB); Dirk Kasper, Duesseldorf (DE)

(73) Assignee: Henkel AG & Co. KGaA, Duesseldorf (DE)

( * ) Notice: Subject to any disclaimer, the term of this patent is extended or adjusted under 35 U.S.C. 154(b) by 59 days.

(21) Appl. No.: 15/465,966

(22) Filed: Mar. 22, 2017

(65) Prior Publication Data

US 2017/0190852 A1 Jul. 6, 2017

Related U.S. Application Data

(63) Continuation of application No. PCT/EP2015/071417, filed on Sep. 18, 2015.

(30) Foreign Application Priority Data

Sep. 30, 2014 (EP) .................................... 14187022

(51) Int. Cl.
*C08G 18/00* (2006.01)
*C08J 5/04* (2006.01)
*C08G 18/76* (2006.01)
*C08J 5/24* (2006.01)
*C08G 18/42* (2006.01)
*C08G 18/66* (2006.01)

(52) U.S. Cl.
CPC .......... *C08J 5/043* (2013.01); *C08G 18/4202* (2013.01); *C08G 18/664* (2013.01); *C08G 18/6674* (2013.01); *C08G 18/7671* (2013.01); *C08J 5/24* (2013.01); *C08J 2375/06* (2013.01); *C08J 2375/08* (2013.01)

(58) Field of Classification Search
CPC ......... C08J 5/043; C08J 5/24; C08G 18/4018; C08G 18/4211; C08G 18/4216; C08G 18/665; C08G 18/6674; C08G 18/7671; C08G 18/664
USPC .......................................................... 524/875
See application file for complete search history.

(56) References Cited

U.S. PATENT DOCUMENTS

| 5,418,310 | A | * | 5/1995 | Kangas | .................. | C08G 18/12 |
| | | | | | | 428/423.1 |
| 8,846,198 | B2 | | 9/2014 | Buechner et al. | | |
| 2002/0040071 | A1 | * | 4/2002 | Lin | ........................ | C08G 18/10 |
| | | | | | | 521/155 |
| 2004/0224595 | A1 | * | 11/2004 | Behnke | ..................... | B32B 5/26 |
| | | | | | | 442/374 |
| 2006/0074214 | A1 | | 4/2006 | Kesselmayer et al. | | |
| 2010/0249291 | A1 | | 9/2010 | Ichihashi et al. | | |
| 2012/0305295 | A1 | * | 12/2012 | Kimura | .............. | C08G 18/0852 |
| | | | | | | 174/254 |
| 2013/0062423 | A1 | * | 3/2013 | Zhang | .................... | C08G 18/10 |
| | | | | | | 238/2 |
| 2014/0371391 | A1 | * | 12/2014 | Ferencz | ............. | C08G 18/4829 |
| | | | | | | 524/871 |

(Continued)

FOREIGN PATENT DOCUMENTS

| CN | 1757694 | A | 4/2006 |
| CN | 101501096 | A | 8/2009 |
| CN | 102574967 | A | 7/2012 |
| EP | 011122 | A1 | 6/1984 |
| EP | 0229929 | A2 | 7/1987 |
| WO | 0029468 | A1 | 5/2000 |
| WO | 2013127732 | A1 | 9/2013 |

(Continued)

OTHER PUBLICATIONS

International Search Report for International PCT Patent Application No. PCT/EP2015/071417 dated Dec. 9, 2015.

(Continued)

*Primary Examiner* — Hannah J Pak
(74) *Attorney, Agent, or Firm* — James E. Piotrowski

(57) ABSTRACT

The invention relates to compositions comprising a fiber material and a specific thermoplastic binder. The thermoplastic binder comprises at least one thermoplastic polyurethane polymer (A), wherein said thermoplastic polyurethane polymer (A) comprises a reaction product of (i) at least one polyester polyol and (ii) at least one polyisocyanate, optionally at least one diol (iii) which is different from the polyester polyol (i) is contained. The molar ratio of the NCO groups of said polyisocyanate (ii) to the sum of OH groups of said polyester polyol (i) and said optionally containing diol (iii) is less than 1.00:1. Said polyester polyol (i) comprises (a) at least one semi-crystalline polyester polyol having a melting point ($T_m$) of from 40 to 180° C., and (b) at least one non-crystalline polyester polyol. Furthermore, the present invention relates to a fiber-reinforced composite comprising a cured thermosetting polyurethane polymer matrix reinforced by the composition according to the present invention. Moreover, a method for the manufacture of the fiber-reinforced composite according to the present invention and use of the composition or the fiber-reinforced composite in railway vehicles, automotive vehicles, aircraft vehicles, boats, space vehicles, motorbikes, bicycles, sporting goods, helmets, functional clothing, shoes, construction parts in bridges and buildings or wind turbine blades are described.

19 Claims, No Drawings

(56) References Cited

U.S. PATENT DOCUMENTS

2017/0058162 A1\* 3/2017 Slark .................. C08G 18/7671
2017/0058163 A1\* 3/2017 Slark .................. C08G 18/7671

OTHER PUBLICATIONS

"The Polyurethanes Handbook", Chapter 6, editors David Randall and Steve Lee, John Wiley and Sons, 2002.

\* cited by examiner

COMPOSITIONS COMPRISING A FIBER MATERIAL AND A THERMOPLASTIC BINDER

The invention relates to compositions comprising a fiber material and a specific thermoplastic binder. The thermoplastic binder comprises at least one thermoplastic polyurethane polymer (A), wherein said thermoplastic polyurethane polymer (A) comprises a reaction product of (i) at least one polyester polyol and (ii) at least one polyisocyanate, optionally at least one diol (iii), which is different from the polyester polyol (i) is contained. The molar ratio of the NCO groups of said polyisocyanate (ii) to the sum of OH groups of said polyester polyol (i) and said optionally containing diol (iii) is less than 1.00:1. Said polyester polyol (i) comprises (a) at least one semi-crystalline polyester polyol having a melting point ($T_m$) of from 40 to 180° C., and (b) at least one non-crystalline polyester polyol. Furthermore, the present invention relates to a fiber-reinforced composite comprising a cured thermosetting polyurethane polymer matrix reinforced by the composition according to the present invention. Moreover, a method for the manufacture of the fiber-reinforced composite according to the present invention and use of the composition or the fiber-reinforced composite in railway vehicles, automotive vehicles, aircraft vehicles, boats, space vehicles, motorbikes, bicycles, sporting goods, helmets, functional clothing, shoes, construction parts in bridges and buildings or wind turbine blades are described.

Fiber-reinforced composites (FRC) contain a fiber material embedded in a cured matrix resin. Usually a binder is applied with the fiber material to hold the fibers together and provide sufficient mechanical support to the fiber material during the manufacturing process of the FRC. Since the finished part shall be persistent to high mechanical stresses, the employed binders should be firmly connected with the fiber material after curing to avoid defects in the fiber-reinforced composite. Imperfections in the binders may have a negative effect on the mechanical properties of the fiber-reinforced composite. For this reason cavities and bubbles should be avoided in the binders when applied to the fiber-material. Binders on the basis of thermosets have several disadvantages. For example, the reactivity of the thermosetting binder is usually extremely high, which leads to an increased generation of heat during curing which can impair the properties of the fiber material. Thermosets also exhibit a limited storage life at room temperature. Moreover, compositions on the basis of thermosetting binders require due to the curing time a prolonged manufacturing process compared to the use of thermoplastic binders. On the other hand the employment of thermoplastics as binders is difficult due to their high melt or solution viscosity when trying to process them into the fiber material. Furthermore layers of fiber materials treated with thermoplastic binders typically tend to show an undesirable tackiness, which can lead to problems during storage. Since the fiber material after it has been processed with the binder material is typically rolled up to a coil and stored, the binder should preferably be essentially non-tacky otherwise the coil cannot be easily unrolled. Moreover, commercially available thermoplastic polymers such as nylons and polycarbonate are of limited interest in composites for structural applications since they have a low thermal stability and a lower creep resistance compared to thermoset polymers.

Therefore, it is an object of the present invention to provide an improved composition comprising fiber material and a thermoplastic binder, which addresses the aforementioned needs, in particular provides a short manufacturing process, good mechanical properties (high stiffness), reduced tackiness (good rewindability), and good storage characteristics (good reactivation).

In this regard, it has been surprisingly found by the present inventors that the composition of the present invention containing a specific thermoplastic binder and a fiber material provides improved stiffening characteristics and a reduced tackiness.

A thermoplastic binder according to the invention can also be referred to as a hot melt adhesive. It is meltable but it is essentially free of reactive functional groups, such as for example isocyanate groups, which may crosslink after application within the thermoplastic binder. However, the thermoplastic binder may comprise functional groups which can react with the thermosetting matrix resin, such as for example hydroxy groups. The thermoplastic binder shall contain a thermoplastic polyurethane (TPU) and further optional additives which will be defined in detail below. The thermoplastic binder is preferably essentially non-tacky at room temperature after application.

In the present specification the terms "a" and "an" and "at least one" are the same as the term "one or more" and can be employed interchangeably.

The term "essentially free" within the context of this invention is to be interpreted as the respective compound is contained in the composition in an amount of less than 5 wt.-%, 4 wt.-%, 3 wt-%, 2 wt.-%, 1.5 wt.-%, 1 wt.-%, 0.75 wt.-%, 0.5 wt.-%, 0.25 wt.-%, or 0.1 wt.-%, based on the total weight of the composition, wherein the amounts are respectively more preferred in descending order. For example, 4 wt.-% is more preferred than 5 wt.-% and 3 wt.-% is more preferred than 4 wt.-%.

The abbreviation "TPU" is to be interpreted as "at least one TPU" unless explicitly stated otherwise.

The abbreviation "TPUs" refers to TPU (A), TPU (A1) and TPU (A2).

The term "composition" is to be interpreted as "composition comprising a fiber material and a thermoplastic binder" unless explicitly stated otherwise.

The terms "resin" or "matrix resin" is to be interpreted as "two-component polyurethane matrix resin" unless explicitly stated otherwise.

In the present invention the molar ratio of the isocyanate (NCO) groups of the polyisocyanate to the sum of the hydroxyl (OH) groups of the polyester polyol and the optionally comprised diol is also referred to as NCO:OH unless explicitly stated otherwise.

In particular, the present invention relates to a composition comprising a fiber material and a thermoplastic binder, wherein the thermoplastic binder comprises at least one thermoplastic polyurethane polymer (A); wherein said thermoplastic polyurethane polymer (A) comprises a reaction product of (i) at least one polyester polyol;
(ii) at least one polyisocyanate; and
(iii) optionally at least one diol which is different from the at least one polyester polyol (i); wherein the molar ratio of the NCO groups of said polyisocyanate (ii) to the sum of OH groups of said polyester polyol (i) and said optionally containing diol (iii) is less than 1.00:1; and
wherein said polyester polyol (i) comprises
(a) at least one semi-crystalline polyester polyol having a melting point ($T_m$) of from 40 to 180° C.; and
(b) at least one non-crystalline polyester polyol.

Furthermore, the invention relates to fiber-reinforced composite comprising a cured thermosetting polyurethane polymer matrix reinforced by the composition according to the present invention, characterized in that fibers are contained in proportions of more than 30% by volume based on the total volume of said fiber-reinforced composite.

Moreover, the invention relates to for the manufacture of fiber-reinforced composites according to the present invention comprising the steps:
1) providing an external mold comprising the composition according to the present invention;
2) introducing the two-component polyurethane matrix resin into said mold under pressure and/or vacuum; and
3) curing said composition at a temperature of up to 140° C., preferably from 60 to 120° C.

In addition to that, the present invention also relates to the use of the composition according to the present invention or the fiber-reinforced composite according to the present invention in railway vehicles, automotive vehicles, aircraft vehicles, boats, space vehicles, motorbikes, bicycles, sporting goods, helmets, functional clothing, shoes, construction parts in bridges and buildings or wind turbine blades.

Further preferred embodiments of the invention are set out in the claims.

The TPU (A) according to the present invention has an NCO:OH ratio of less than 1:1. In preferred embodiments the NCO:OH ratio is in a range having any combination of an upper limit selected from less than 0.99:1, 0.975:1, 0.95:1, 0.9:1, 0.85:1, 0.8:1, 0.75:1 or 0.7:1 and having a lower limit selected from 0.65:1, 0.7:1, 0.75:1, 0.8:1, 0.85:1, 0.9:1. In more preferred embodiments the NCO:OH ratio is in the range 0.65 to 0.95:1. In even more preferred embodiments the NCO:OH ratio is 0.7 to 0.9:1.

(A1) has preferably an NCO:OH ratio of less than 0.90:1. In preferred embodiments the NCO:OH ratio is in a range having any combination of an upper limit selected from less than 0.9:1, 0.85:1, 0.8:1, 0.75:1 or 0.7:1 and having a lower limit selected from 0.65:1, 0.7:1, 0.75:1, 0.8:1, 0.85:1. In more preferred embodiments the NCO:OH ratio is in the range of 0.7:1 to less than 0.9:1. In most preferred embodiments the NCO:OH ratio is 0.75:1 to 0.85:1.

(A2) preferably has an NCO:OH ratio of more than 0.90:1. In preferred embodiments the NCO:OH ratio is in a range having any combination of a lower limit selected from more than 0.90:1, 0.91:1, 0.92:1, 0.93:1, 0.94:1, 0.95:1, 0.96:1, 0.97:1, 0.98:1, or 0.99:1 and an upper limit of less than 1.00:1, 0.99:1, 0.98:1, 0.97:1, 0.96:1, 0.95:1, 0.94:1, 0.93:1, 0.92:1, 0.91:1, In a more preferred embodiment the NCO:OH ratio is in the range of 0.93:1 to 0.97:1.

The TPU (A) according to the invention comprises
(a) at least one semi-crystalline polyester polyol having a melting point ($T_m$) of from 40 to 180° C., preferably 60 to 150° C., more preferably 70 to 120° C. (as determined by DSC as defined below), and
(b) at least one non-crystalline polyester polyol.

The at least one semi-crystalline polyester polyol according to item (a) has preferably a number average molecular weight ($M_n$, measured by GPC as defined below) of more than 750 g/mol. In more preferred embodiments the $M_n$ is in a range having any combination of a lower limit selected from more than 750, 1,000, 2,000, 3,000, 4,000, 5,000, 6,000, 7,000, 8,000, 9,000 and 9,500 g/mol and an upper limit selected from 10,000, 9,000, 8,000, 7,000, 6,000, 5,000, 4,500, 4,000, 3,500, 3,000, 2,500, 2,000, and 1,000 g/mol. In even more preferred embodiments the range is 1,000 to 7,000 g/mol. In most preferred embodiments the range is 1,000 to 5,000 g/mol. The composition of this polyester polyol can be selected from the acid and diol monomers as listed below, which form a semi-crystalline or a crystalline polyester, respectively. Preferably diol components are used including aliphatic diols, such as 1,4-butane diol and 1,6-hexane diol.

The thermoplastic binder contains in preferred embodiments the polyester polyol according to item (a) from 5 to 50 wt.-%, based on the total weight of the TPU (A). In more preferred embodiments the polyester polyol according to item (a) is contained from 10 to 40 wt.-% and in most preferred embodiments from 15 to 30 wt.-%.

The thermoplastic binder contains in preferred embodiments the polyester polyol according to item (b) from 10 to 90 wt.-%, based on the total weight of the TPU (A). In more preferred embodiments the polyester polyol according to item (b) is contained from 20 to 80 wt.-% and in most preferred embodiments from 30 to 60 wt.-%.

The non-crystalline polyester polyols (b) have preferably a glass transition temperature ($T_g$) from 50 to −70° C., more preferably from 30 to −60° C., most preferably from 20 to −50° C. The non-crystalline polyester polyols can preferably be liquid polyester polyols, which preferably have a viscosity of 500 to 50,000 mPa·s at room temperature (about 25° C.).

The at least one non-crystalline polyester polyol according to item (b) preferably comprises
(b1) a non-crystalline polyester polyol having a number average molecular weight ($M_n$) of less than 750 g/mol; and
(b2) a non-crystalline polyester polyol having a number average molecular weight ($M_n$) of at least 750 g/mol.

The at least one non-crystalline polyester polyol according to item (b1) has preferably a number average molecular weight ($M_n$, measured by GPC as defined below) of less than 750 g/mol. In more preferred embodiments the $M_n$ is in a range having any combination of a lower limit selected from 200, 300, 400, 500, 600, and 700 g/mol and an upper limit selected from 740, 700, 600, 500, 450, 400, 350, 300, and 250 g/mol. In more preferred embodiments the range is 700 to 250 g/mol. In most preferred embodiments the range is 600 to 300 g/mol. The composition of this polyester polyol can be selected from the acid and diol monomers as listed below, which form a non-crystalline polyester. Preferably employed diol components are ethylene glycol, diethylene glycol, propylene glycol and neopentyl glycol.

The at least one non-crystalline polyester polyol according to item (b2) has preferably a number average molecular weight ($M_n$, measured by GPC as defined below) of at least 750 g/mol. In more preferred embodiments the $M_n$ is in a range having any combination of a lower limit selected from 760, 1,000, 2,000, 3,000, 4,000, 5,000, 6,000, 7,000, 8,000, 9,000, 9,500 and 9,750 g/mol and an upper limit selected from 10,000, 9,000, 8,000, 7,000, 6,000, 5,000, 4,500, 4,000, 3,500, 3,000, 2,500, 2,000, and 1,000 g/mol. In more preferred embodiments the range is 1,000 to 7,000 g/mol. In most preferred embodiments the range is 1,000 to 5,000 g/mol. The composition of this polyester polyol can be selected from the acid and diol monomers as listed below, which form a non-crystalline polyester. Preferably diol components are used including ethylene glycol, diethylene glycol, propylene glycol and neopentyl glycol.

The thermoplastic binder contains in preferred embodiments the polyester polyol according to item (b1) from 5 to 50 wt.-%, based on the total weight of the TPU (A). In more preferred embodiments the polyester polyol according to item (b1) is contained from 10 to 40 wt.-% and in most preferred embodiments from 15 to 30 wt.-%.

The thermoplastic binder contains in preferred embodiments the polyester polyol according to item (b2) from 10 to 60 wt-%, based on the total weight of the TPU (A). In more preferred embodiments the polyester polyol according to item (b2) is contained from 20 to 50 wt.-% and in most preferred embodiments from 25 to 50 wt.-%.

In more preferred embodiments the thermoplastic binder according to the invention comprises 10 to 30 wt.-% of compound (a); 10 to 35 wt.-% of compound (b1); 10 to 35 wt.-% of compound (b2); and 10 to 25 wt.-% of the at least one polyisocyanate, based on the total weight of the TPU (A).

Main components of the TPUs according to the invention are polyester polyols. These shall include crystalline and semi-crystalline polyester polyols which are in the present invention referred to as semi-crystalline polyester polyols, and non-crystalline polyester polyols which include liquid polyester polyols and solid amorphous polyester polyols. Polyester polyols are well known to the skilled person and they can be obtained by a reaction of polycarboxylic acids and polyols. Thereby it is possible to include small amounts of three-functional alcohols or carboxylic acids in the reactions in order to incorporate branching without crosslinking. To obtain linear polyester polyols it is preferred that most of the monomers are difunctional components. The properties of the polyester polyols can be adjusted according to the type of comonomers. It is well known to the skilled person how to prepare semi-crystalline and non-crystalline polyester polyols. The polyester shall contain at least two hydroxyl groups. The properties of the polyester can be designed by the different components. For example, a single linear aliphatic diol and a linear aliphatic diacid will tend to provide semi-crystalline polymers. Increasing melting point can be obtained by increasing the length of the carbon chain in the diacid or by using symmetrical aromatic diacids. More amorphous materials can be obtained by increasing the number of comonomers or incorporating branched aliphatic comonomers. The polyester polyols can comprise further functional groups like NH or COOH which can also react with the one or more isocyanates. Suitable monomers for the preparation are described below.

The components of the TPUs are selected in a way, so that preferably linear polyurethanes are obtained. In order to obtain a TPU which is essentially free of NCO groups the amount of the NCO groups (equivalents) in the one or more isocyanate is selected to be smaller than the amount (equivalents) of reactive OH, SH, $NH_2$, COOH groups of the polyester polyols.

Suitable polyester for TPUs shall contain at least two hydroxyl groups. Suitable polyester polyols for TPUs are formed through the condensation of one or more polyhydric alcohols having preferably from 2 to 30 carbon atoms with one or more polycarboxylic acids having preferably from 2 to 14 carbon atoms. Suitable polyols include alkylene diols, in particular linear alcohols with 2 to 30 C atoms, which exhibit up to four, preferably two OH groups; glycol ethers; and alicyclic polyols. Examples of suitable polyhydric alcohols include ethylene glycol, propylene glycol such as 1,2-propylene glycol and 1,3-propylene glycol, glycerol, pentaerythritol, trimethylolpropane, butanediol, pentanediol, hexanediol, dodecanediol, octanediol, chloropentanediol, glycerol monoallyl ether, glycerol monoethyl ether, diethylene glycol, 2-ethylhexanediol, 1,4-cyclohexanediol, 1,2,6-hexanetriol, 1,3,5-hexanetriol, 1,3-bis-(2-hydroxyethoxy)propane and the like. The polyols can be used separately or in mixture. They preferably have a molecular weight from 100 to 750 g/mol, their functionality is preferably 2 or 3.

Examples of polycarboxylic acids include ortho-phthalic acid, iso-phthalic acid, terephthalic acid, tetrachlorophthalic acid, maleic acid, dodecylmaleic acid, octadecenylmaleic acid, fumaric acid, aconitic acid, trimellitic acid, tricarballylic acid, 3,3'-thiodipropionic acid, succinic acid, adipic acid, suberic acid, azelaic acid, malonic acid, glutaric acid, pimelic acid, sebacic acid, cyclohexane-1,2-dicarboxylic acid, 1,4-cyclohexadiene-1,2-dicarboxylic acid, 3-methyl-3,5-cyclohexadiene-1,2-dicarboxylic acid and the corresponding acid anhydrides, acid chlorides and acid esters such as phthalic anhydride, phthaloyl chloride and the dimethyl ester of phthalic acid. Dimer fatty acids can also be used, where they are the dimerization product of mono- or poly-unsaturated acids and/or esters thereof. Preferred dimer fatty acids are dimers of C10 to C30, more preferably C14 to C22 carbon acids. Suitable dimer fatty acids include the dimerization products of oleic acid, linoleic acid, linolenic acid, palmitoleic acid and elaidic acid. The dimerization products of the unsaturated fatty acid mixtures obtained in the hydrolysis of natural fats and oils, e.g., sunflower oil, soybean oil, olive oil, rapeseed oil, cottonseed oil and tall oil may also be used. In addition to the dimer fatty acids, dimerization usually results in varying amounts of oligomeric fatty acids and residues of monomeric fatty acids. Suitable dimer fatty acids have a dimer acid content greater than 75 wt.-% based on the total weight of the dimer fatty acid starting material.

Further suitable polyester polyols for TPUs are polycarbonate polyols. Polycarbonate polyols can be received for example by the reaction from diols, like propylene glycol, butanediol-1,4 or hexanediol-1,6, diethyleneglycol, triethyleneglycol or tetraethylene glycol or mixtures from two or more from it with diarylcarbonates, as for example diphenyl carbonate, or phosgene. Polyesters on the basis of ε-caprolactone are also suitable. Also polyester polyols are suitable, which contain one or more urethane groups in the polymer chain.

Other useful polyester polyols for TPUs include, e.g., polyols derived from oleochemicals, and the complete ring opening of epoxidized triglycerides of an at least partially olefinic unsaturated fatty acid-containing fat mixture and at least one alcohol containing from 1 carbon atom to 12 carbon atoms, followed by partial transesterification of the triglyceride derivatives to form alkyl ester polyols having from 1 carbon atom to 12 carbon atoms in the alkyl chain.

Commercially available polyester polyols which may be used in the practice of the invention for TPUs include semi-crystalline or non-crystalline polyesters. For this invention it shall be understood, that the term polyester polyol shall include also polyester, which comprise at the end of the polymer chain amino groups or carboxylic groups. But the preferred end group of such polyester are hydroxyl groups, i.e. a preferred polyester polyol is a polyester diol with two hydroxyl groups at the end of the polymer chain.

Preferred polycarboxylic acids are the aliphatic and cycloaliphatic dicarboxylic acids containing no more than 14 carbon atoms and the aromatic dicarboxylic acids containing no more than 14 atoms. In more preferred embodiments the at least one polyester polyol of TPU (A) comprises an ortho-phthalate. In even more preferred embodiments the at least one polyester polyol of TPU (A1) and/or (A2) comprises an ortho-phthalate. It should be understood that "comprising ortho-phthalate" in this context is to be interpreted that the term "ortho-phthalate" also includes derivatives thereof, i.e. the polyester polyol is obtained by reacting a mixture including, at least one of ortho-phthalate, phthalic anhydride, or derivatives thereof or combinations thereof. In even more preferred embodiments, the ortho-phthalate is comprised in the polyester polyol of TPU (A) or (A1) and/or (A2) according to item (b) (described below). In most preferred embodiments the ortho-phthalate is comprised in the polyester polyol of TPU (A) or (A1) and/or (A2) according to item (b1).

As suitable monomeric isocyanates to be used in the synthesis for TPUs preferably isocyanates which contain two or three NCO groups are selected. They include well-known aliphatic, cyclo-aliphatic or aromatic monomeric diisocyanates. Preferably isocyanates are selected with a molecular weight from 160 g/mol to 500 g/mol, for example aromatic polyisocyanates as the isomers of diphenylmethanediisocyanate (MDI), such as 4,4'-diphenylmethanediisocyanate (4,4'-MDI), 2,2'-diphenylmethane diisocyanate (2,2'-MDI), 2,4'-diphenylmethanediisocyanate (2,4'-MDI); the isomers of phenylenediisocyanate, such as 1,3-phenylenediisocyanate, 1,4-phenylenediisocyanate; naphthalene-1,5-diisocyanate (NDI), the isomers of toluenediisocyanate (TDI), such as 2,4-TDI and 2,6-TDI; m- and p-tetramethyl xylylene diisocyanate (TMXDI), m- and p-xylylenediisocyanate (XDI), 3,3'-dimethyldiphenyl-4,4'-diisocyanate (TODI), toluene diisocyanate, naphthalene, di- and tetraalkyl diphenylmethane diisocyanate, 4,4'-dibenzyl diisocyanate, and combinations thereof.

Aliphatic and cyclo-aliphatic isocyanates such as ethylene diisocyanate, dodecane diisocyanate, dimer fatty acid diisocyanate, 4,4'-dibenzyldiisocyanate, 1,6-diisocyanato-2,2,4-trimethylhexane, butane-1,4-diisocyanate, hexane-1,6-diisocyanate (HDI), tetramethoxybutane-1,4-diisocyanate, 1,12-diisocyanato-dodecane, 4,4'-dicyclohexylmethanediisocyanate, 1,3-cyclohexane or 1,4-cyclohexane diisocyanate, 1-methyl-2,4-diisocyanatocyclohexane, 1-isocyanatomethyl-3-isocyanato-1,5,5-trimethylcyclohexane (isophorone diisocyanate, IPDI), hydrogenated or partly hydrogenated MDI ([H]12MDI (hydrogenated) or [H]6MDI (partly hydrogenated), and combinations thereof can also be used.

Preferably, diisocyanates with two NCO groups of different reactivity are selected from the group of the aromatic, aliphatic or cyclo-aliphatic diisocyanates. It is also possible to include at least partly oligomeric diisocyanates such as allophanate, carbodiimide, isocyanurate, biuret condensation products from diisocyanates, e.g., from HDI, MDI, IPDI or other isocyanates. Polymeric MDI can also be employed. Mixtures of aliphatic or aromatic isocyanates can be used. More preferably aromatic diisocyanates are used.

The thermoplastic binder contains in preferred embodiments the isocyanate from 5 to 40 wt.-%, based on the total weight of the TPU. In more preferred embodiments isocyanate is contained from 10 to 30 wt.-% and in most preferred embodiments from 10 to 25 wt.-%.

The TPUs according to the present invention can optionally comprise a diol (iii). Useable diols (iii) according to the invention preferably have a molecular weight of less than 250 g/mol and are well known to the skilled person. Exemplarily compounds are for example disclosed in Appendix 1 page 448 of "The Polyurethanes Handbook", editors David Randall and Steve Lee, John Wiley and Sons 2002. In preferred embodiments the diol (iii) comprises alkane diols having at least two primary OH groups and/or alkane diols having a primary and a secondary OH group. In more preferred embodiments, the diol (iii) is selected from 1,3-propane diol 1,4-butane diol, 1,6-hexane diol, 1,8-octane diol, 1,12-dodecane diol, cyclohexanedimethanol, hydrogenated bis-phenol A which can be substituted with alkyl, cycloalkyl, phenyl or ether groups, ethylene glycol, diethylene glycol, triethylene glycol, neopentyl glycol, dipropylene glycol, dibutylene glycol, 1,2-propanediol, 1,2-butanediol, 1,3-butanediol, 1,2-pentanediol, 1,3-pentanediol, 1,4-pentanediol, 2-methyl-1,3-propanediol, 2,2,4-trimethyl-1,3-pentanediol, 1,2-hexanediol, 1,3-hexanediol, 1,4-hexanediol, 1,5-hexanediol, 2-ethyl-1,3-hexanediol, 1,2-heptanediol, 1,3-heptanediol, 1,4-heptanediol, 1,5-heptanediol, 1,6-heptanediol, 1,2-octanediol, 1,3-octanediol, 1,4-octanediol, 1,5-octanediol, 1,6-octanediol, 1,7-octanediol, and combinations thereof. In most preferred embodiments the diol (iii) is selected from 1,4-butane diol or 1,3-butane diol.

The diol (iii) can be included in a mixture comprising (i) and (ii) and then together reacted or the diol (iii) can be reacted with a reaction product of (i) and (ii). Preferably, the diol (iii) is added to the reaction product of (i) and (ii), where (i) and (ii) are reacted in a first step with an NCO:OH ratio >1.00.

The TPUs can further comprise a polyether polyol such as poly(ethylene glycol), poly(propylene glycol) or poly(tetramethylene glycol). Polyether polyols are known to the skilled person and exemplarily compounds are disclosed for example in "The Polyurethanes Handbook", Chapter 6, editors David Randall and Steve Lee, John Wiley and Sons 2002.

The manufacture of the TPUs is well known in the art and can be performed in any reaction vessel which can be heated. In a typical process the polyol components are mixed together as a melt with the resulting composition is optionally dried and a vacuum is optionally applied until the moisture content is below 250 ppm. Subsequently the isocyanates are added to the polyol mixture and this mixture is reacted. The person skilled in the art knows how to determine the temperature and time to complete the reaction. The TPU can be made in solvents but this is not preferred because the solvent needs to be removed before using the TPUs as a thermoplastic binder.

The TPU (A) has preferably a number average molecular weight ($M_n$) of 5,000 to 80,000 g/mol, more preferably 5,000 to 40,000 g/mol, most preferably 10,000 to 30,000 g/mol.

In a preferred embodiment, the thermoplastic binder composition comprises at least two different thermoplastic polyurethane polymers (A) according to the present invention, wherein the first thermoplastic polyurethane polymer (A1) has a number average molecular weight (Mn) of less than 25,000 g/mol;
wherein the second thermoplastic polyurethane polymer (A2) has a number average molecular weight (Mn) of at least 25,000 g/mol; and preferably wherein the weight ratio of (A1) to (A2) is preferably 5:95 to 95:5.

(A1) has preferably a number average molecular weight ($M_n$, measured by GPC as defined below) of less than 25,000 g/mol. In more preferred embodiments the $M_n$ is less than 24,000, 22,500, 20,000, 15,000, 10,000, 7,500, or 5,000 g/mol. Thereby the respective embodiments are with descending order of the amounts more preferred. That means for example 20,000 g/mol is more preferred than 22,500 g/mol and 22,500 g/mol is more preferred than 25,000 g/mol. In even more preferred embodiments the $M_n$ is in a range of from 20,000 to 5,000 g/mol, in most preferred embodiments the range is 15,000 to 7,500 g/mol.

(A2) has preferably a number average molecular weight ($M_n$, measured by GPC as defined below) of at least 25,000 g/mol. In more preferred embodiments the $M_n$ is at least 26,000, 30,000 35,000, 40,000, 45,000, 50,000, 60,000, 70,000, or 80,000 g/mol. Thereby the respective embodiments are with ascending order of the amounts more preferred. That means for example 40,000 g/mol is more preferred than 35,000 g/mol and 45,000 g/mol is more preferred than 40,000 g/mol. In even more preferred embodiments the Mn is in a range of from 30,000 to 60,000 g/mol, in most preferred embodiments the range is 30,000 to 50,000 g/mol.

The manufacture of the binder composition can be performed as known in the art. The TPUs according to the invention are manufactured and thereafter are blended with the different components and additives. This can be done in any known device, e.g., batch reactor, extruder, mixer, kneader or similar machines. It is also possible for some ingredients to be added to the polyester polyol before reaction with the isocyanate, provided that functional materials on the additives do not interfere with the reaction between polyol and isocyanate.

The TPU (A) according to the present invention preferably contains (A2) to (A1) in a weight ratio of 5:95 to 95:5. More preferably 15:85 to 85:15, most preferably 25:75 to 75:25.

The thermoplastic binder according to the invention shall contain at least one TPU (A) as disclosed above. The thermoplastic binder according to the invention preferably comprises of 50 to 99.9 wt-% of a TPU (A) according to the invention, based on the total weight of the thermoplastic binder. More preferably the composition comprises 60 to 95 wt.-% of a TPU (A), most preferably 75 to 90 wt.-%.

The thermoplastic binder may contain other additives which are known in the art. The term "additive" includes dyes, fillers (e.g., silicates, talcum, calcium carbonates, clays or carbon black), thixotropic agents (e.g., bentones, pyrogenic silicic acids, urea derivatives, fibrillated or pulp short fibers), color pastes and/or pigments, conductivity additives (e.g., conductivity carbon blacks or lithium perchlorate), plasticizers, tackifiers, other thermoplastic polymers, which are different from the TPUs according to the invention, stabilizers, adhesion promoters, rheological additives, waxes and any combination thereof.

The thermoplastic binder according to the present invention preferably comprises 0.1 to 50 wt.-% of additives, based on the total weight of the thermoplastic binder. In more preferred embodiments 5 to 40 wt.-%, most preferably 10 to 25 wt.-% are contained.

The thermoplastic binder according to the invention may contain tackifiers, such as, e.g., resins derived from abietic acid, abietic acid esters, other rosin esters, polyterpene resins, terpene/phenolic resins, styrenated terpenes, poly-alpha-methylstyrene, alpha-methylstyrene-phenolic or aliphatic, aromatic or aromatic/aliphatic hydrocarbon resins or coumarone/indene resins or resins derived from low molecular weight polyamides. These tackifying resins may optionally contain OH groups, to improve compatibility of the different components.

The thermoplastic binder according to the present invention preferably comprises 0.1 to 50 wt.-% of at least one tackifier, based on the total weight of the thermoplastic binder. In more preferred embodiments 5 to 40 wt.-%, most preferably 10 to 25 wt.-%, are contained.

The thermoplastic binder according to the invention may contain other thermoplastic polymers, which are different from the TPUs according to the present invention. These include but are not limited to EVA, rubber type polymers, styrene copolymers, polyester copolymers, polycarbonates, polyamides, acrylics and thermoplastic polyurethanes.

The thermoplastic binder according to the present invention preferably comprises 0.1 to 50 wt.-% of at least one other thermoplastic polymer, which is different from the TPUs according to the present invention, based on the total weight of the thermoplastic binder. In more preferred embodiments 5 to 40 wt-%, most preferably 10 to 25 wt.-%, are contained.

The thermoplastic binder according to the present invention preferably comprises 0.1 to 50 wt.-% of at least one filler, based on the total weight of the thermoplastic binder. In more preferred embodiments 5 to 40 wt-%, most preferably 10 to 25 wt.-%, are contained.

The thermoplastic binder according to the invention may contain plasticizers, provided that these plasticizers do not interfere with the adhesive capability of the binders—such as phthalates, benzoates, sucrose esters and sulphonamides. By way of example there may be mentioned the liquid phthalate plasticizers, plasticizers based on aromatic esters, such as, e.g., esters of benzoic acid, or also solid plasticizers such as dicyclohexyl phthalate, cyclohexane dimethanol dibenzoate and the like. Also suitable are other plastcizers such as sucrose acetate isobutyrate, ortho-/para-toluene sulphonamide or N-ethyl-ortho-toluene sulphonamide.

The thermoplastic binder according to the present invention preferably comprises 0.1 to 50 wt.-% of plasticizers, based on the total weight of the thermoplastic binder. In more preferred embodiments 5 to 40 wt.-%, most preferably 10 to 25 wt.-% are contained.

As stabilizers, different components can be used such as antioxidants, UV stabilizers, and hydrolysis stabilizers. Examples for these components are sterically hindered phenols of high molecular weight, sulphur-containing and phosphorus-containing phenols or amines. This include sterically hindered phenols, polyfunctional phenols, thioether, substituted benzotriazoles, hindered benzophenone and/or sterically hindered amines of the "HALS" (Hindered Amine Light Stabilizer) type. Examples of hydrolysis stabilizers include oligomeric and/or polymeric aliphatic or aromatic carbodiimides. Such components are commercially available and known to the skilled person.

The thermoplastic binder according to the present invention preferably comprises 0.1 to 10 wt.-% of stabilizer, based on the total weight of the thermoplastic binder. In more preferred embodiments 0.2 to 5 wt.-%, most preferably 0.5 to 3 wt.-% are contained.

As adhesion promoters, preferably organofunctional silanes can be used, either in monomeric, oligomeric or polymeric form. The thermoplastic binder according to the present invention preferably comprises 0.1 to 10 wt.-% of adhesion promoter, based on the total weight of the thermoplastic binder. In more preferred embodiments 0.2 to 5 wt.-%, most preferably 0.5 to 3 wt.-% are contained.

The thermoplastic binder according to the present invention has preferably a viscosity of 1,000 to 100,000 mPa·s at 160° C. In preferred embodiments, the viscosity is in a range having any combination of a lower limit selected from 1,000, 2,000, 3,000, 4,000, 5,000, 7,500, 10,000, 15,000, 20,000, 25,000, 30,000, 35,000, 40,000, 45,000, 50,000, and 70,000 mPa·s and an upper limit selected from 100,000, 90,000, 80,000, 70,000, 60,000, 50,000, 45,000, 40,000, 35,000, 30,000, 25,000, and 20,000 mPa·s. In more preferred embodiments the viscosity is between 2,000 and 70,000 mPa·s. In most preferred embodiments the viscosity is between 3,000 and 50,000 mPa·s.

The compositions of the present invention preferably comprise 0.1 to 40 wt.-% of the thermoplastic binder; and 60 to 99.9 wt.-% of the fiber material based on the total weight of the composition.

In the composition according to the present invention, the fiber material contains preferably fibers selected from glass fibers, synthetic fibers, carbon fibers, boron fibers, ceramic fibers, metal fibers, natural fibers and combinations thereof, most preferably glass fibers, carbon fibers and combinations thereof. Specific examples of the respective category of fibers are disclosed in AR. Bunsell, J. Renard "Fundamentals of Fibre Reinforced Composite Materials", CRC Press 2005, ISBN 0750306890. Examples for synthetic fibers include polyester fibers, polyethylene fibers, polypropylene fibers, polyamide fibers, like polyamide 6 or polyimide 6.6, polyimine fibers, poly (methyl methacrylate) and aramid fibers. Ceramic fibers include oxide and non-oxide ceramic fibers like aluminum oxide/silicon dioxide fibers, basalt fibers and carbon silicide fibers. Examples of metal fibers are steel, stainless steel or aluminum fibers. Examples of natural fibers are wood fibers, sisal fibers, flax fibers, hemp fibers, coconut fibers, banana fibers and jute fibers.

The fiber material can preferably be in the form of a mat, like a continuous fiber mat or a chopped strand mat, woven fabric, nonwoven fabric, non-crimped fabric, knitted fabric, plies, or roving.

In preferred embodiments of the composition, two or more of the forms of the fiber material can be employed. These forms can comprise one or more of the above described fibers, respectively.

The length of the fibers can be 0.1 to 1 mm, 1 to 50 mm or above 50 mm. In preferred embodiments the fiber length is above 50 mm, more preferably above 500 mm, most preferably the fiber is "endless", i.e. the fiber is a continuous fiber. Endless fibers or continuous fibers are employed in continuous fiber mats for the manufacture of endless fiber reinforced composites, in particular endless fiber reinforced plastics. "Continuous" or "endless" means that the fibers reach from one end of the fiber mat to another, such that the fiber ends are located at the outer edges of the fiber mat and not inside the fiber mat. This improves the mechanical properties of the fiber reinforced composites.

In a preferred embodiment glass or carbon fibers having a length of above 500 mm are employed, more preferably these fibers are in the form of mats, nonwoven fabric and non-crimped fabric or combinations thereof.

The present invention also relates to a composite, which comprises a cured thermosetting polyurethane polymer matrix reinforced by the composition according to the present invention, wherein the cured thermosetting polyurethane polymer matrix is a thermoset, preferably according to DIN 7708-1:1980-12. In preferred embodiments the fibers are contained in proportions of more than 30 vol.-%, based on the total volume of said fiber-reinforced composite. In more preferred embodiments the fibers are contained in 30 to 65 vol.-%, most preferred in 40 to 55 vol.-%, based on the total volume of said fiber-reinforced composite.

The fiber weight fraction can be experimentally determined, for example by the ignition loss method (ASTM D2854) or the matrix digestion method (ASTM D3171). The vol.-% of carbon fibers can preferably be measured according to DIN EN 2564:1998-08 in case of glass fibers preferably DIN EN ISO 1172:1998-12 can be employed. For unidirectional composites containing electrically conductive fibers (such as carbon) in a non-conductive matrix, the fiber volume fraction can be determined directly by comparing the electrical resistivity of the composite with that of fibers (ASTM D3355).

The cured thermosetting polyurethane polymer matrix for the fiber-reinforced composite is obtainable by the reaction of a two-component polyurethane matrix resin comprising at least one polyol (I) having a number average molecular weight ($M_n$) of less than 3000 g/mol;

at least one polyisocyanate (II);

wherein the molar ratio of the OH groups of said polyol (I) to the NCO groups of said polyisocyanate (II) is from 2:1 to 1:10, preferably from 2:1 to 1:5, most preferably from 2:1 to 1:2.

The at least one polyol (I) contains two or more hydroxyl groups per molecule. In preferred embodiments the number of hydroxyl groups per molecule is in a range having any combination of a lower limit selected from 2, 3 and an upper limit of 8, 7, 6, 5. In more preferred embodiments the number of hydroxyl groups per molecule is from 2 to 8, in most preferred embodiments from 3 to 5.

It is preferred that the hydroxyl groups of the least one polyol (I) are selected from primary and/or secondary hydroxyl groups. Furthermore it is preferred, that the hydroxyl groups of the least one polyol (I) are connected to aliphatic carbon atoms.

The at least one polyol (I) has a number average molecular weight ($M_n$) of less than 3000 g/mol. In preferred embodiments the number average molecular weight ($M_n$) is in a range having any combination of a lower limit selected from more than 100, 150, 200 and an upper limit of 2500, 2000, 1500 g/mol. In more preferred embodiments the number average molecular weight ($M_n$) is form 100 to 2500 g/mol, and in most preferred embodiments from 200 to 1500 g/mol.

In a preferred embodiment the at least one polyol (I) has a viscosity of less than 5000 mPa·s, preferably from 2700 to 4000 mPa·s (DIN ISO 2555, Brookfield RVT, spindle No. 4, 25° C.; 20 rpm).

As polyols (I) polyester polyols can be used. It is also possible to use polycarbonate polyols as polyols (I). Suitable polyester polyols and polycarbonate polyols can be selected from the aforementioned polyester polyols and polycarbonate polyols employed for the synthesis of TPUs.

It is also possible to use polyhydric alcohols having 2 to 30 carbon atoms as polyols (I) selected from the aforementioned polyhydric alcohols which are used in the synthesis of the polyesters for TPUs as mentioned above.

In a preferred embodiment polyether polyols are used as polyols (I). Polyether polyols containing 2, 3 or 4 hydroxyl groups are preferred. The polyether polyols are preferably obtained by reacting polyhydric alcohols or water with alkylene oxides. The polyhydric alcohols preferably contain 2, 3 or 4 hydroxyl groups. Examples for suitable polyhydric alcohols for the synthesis of polyether polyols can be selected from the aforementioned diols (iii) as employed for the synthesis of the TPUs, glycerol, hexanetriol, trimethylolpropane, pentaerythritol, sugar alcohols, resorcinol, hydroquinone, 1,2,2- or 1,1,2-tris-(hydroxyphenyl)ethane, and mixtures thereof.

Examples of suitable alkylene oxides are ethylene oxide, propylene oxide, butylene oxide, tetrahydrofuran or mixtures thereof. Polyoxyethylene polyols or polyoxypropylene polyols with 2 or 3 hydroxyl groups are preferred. The polyether polyols have a number average molecular weight ($M_n$) preferably in a range from 170 to 3000 g/mol, more preferably from 170 to 1000 g/mol, most preferably from 170 to 350 g/mol.

As the at least one polyisocyanate (II) isocyanates with at least two isocyanate groups are used. The isocyanates preferably contain on 2 to 5, more preferably from 2 to 4 NCO groups. They include the well-known aliphatic, cyclo-aliphatic or preferably aromatic monomeric diisocyanates.

Preferred polyisocyanates can be selected from the polyisocyanates as used in the synthesis for TPUs as mentioned above.

Proportions of low molecular weight prepolymers, preferably with a number average molecular weight ($M_n$) of less than 2000 g/mol, may also be used as polyisocyanates (II), for example reaction products of MDI or TDI with polyhydric alcohols selected from the aforementioned group of polyhydric alcohols having 2 to 30 carbon atoms which can be used as polyol (I), such as for instance ethylene glycol, diethylene glycol, propylene glycol, dipropylene glycol or triethylene glycol. These low molecular weight prepolymers may be produced by reacting an equivalent excess of monomeric polyisocyanate in the presence of polyhydric alcohols, preferably diols. The number average molecular weight ($M_n$) of the diols is preferably below 1000 g/mol. Residual monomeric isocyanates may optionally be removed from the reaction product by distillation.

In one embodiment of the invention aromatic diisocyanates are preferred as polyisocyanates (II), while in another embodiment mixtures of aliphatic and/or cyclo-aliphatic with aromatic isocyanates are preferably used. It is preferred, that at least 50 mol % of the NCO groups of the at least one polyisocyanate (II) originate from the isomers of MDI.

The viscosity of the at least one polyisocyanate (II) is preferably less than 80 mPa·s, particularly preferably from 30 to 60 mPa·s (DIN ISO 2555, Brookfield RVT, spindle No. 3, 25° C.; 50 rpm).

The two-component polyurethane matrix resin comprises from 0 to 10 wt.-% of at least one auxiliary substance based on the total weight of the two-component polyurethane matrix resin. The at least one auxiliary substances is preferably admixed wholly or partially with the at least one polyol (I), The auxiliary substances can be added in order to modify the properties of the composition, such as for example viscosity, wetting behavior, stability, reaction kinetics, avoidance of bubble formation, storage life or adhesion. Examples of auxiliary substances are leveling agents, wetting agents, catalysts, desiccants and the aforementioned additives for use in the thermoplastic binder.

As catalysts the two-component polyurethane matrix resin can comprise metal organic compounds based on iron, titanium, zirconium, aluminum, lead, bismuth and preferably tin. In a preferred embodiment the catalysts contain polyhydroxy compounds as chelating agents in a molar ratio of 0.25:1 to 2:1 to the metal atoms, said compounds being selected from cyclic α-hydroxyketones and/or triphenols with three adjacent OH groups. The polyhydroxyl compounds used as chelating agents preferably have a number average molecular weight ($M_n$) of less than 500 g/mol or they may also be bound to a support. Substances suitable as chelating agents are in particular those which optionally comprise a further OH, COOH or ester group. During the crosslinking reaction, said chelating agents may accordingly also react with the two-component polyurethane matrix resin and be firmly incorporated into the cured thermosetting polyurethane polymer matrix.

Another group of catalysts which can be used in the two-component polyurethane matrix resin are those based on tertiary amines. As an example, linear or preferably cyclic aliphatic amines can be employed, such as methylcyclohexylamine, dimethylbenzylamine, tributylamine, monoethanolamine, triethanolamine, diethylenetriamine, triethylenetetramine, triethylenediamine, guanidine, morpholine, N-methylmorpholine, diazabicyclooctane (DABCO), 1,8-diazabicyclo-(5,4,0)-undecene-7 (DBU) or diazabicyclononene (DBN).

In preferred embodiment the catalyst is contained in a quantity of 0.01 to 5 wt.-% based on the total weight of the two-component polyurethane matrix resin.

Preferably, no pigments, molecular sieves, fillers and/or plasticizers are present in the two-component polyurethane matrix resin. Furthermore, the two-component polyurethane matrix resin preferably contains no organic solvents.

In a preferred embodiment the two-component polyurethane matrix resin contains 30 to 70 wt.-% of polyols with a functionality of greater than 2, preferably greater than 3, in particular polyether polyols and polyester polyols, 70 to 30 wt.-% of polyisocyanates, wherein in particular at least 50 mol % of all isocyanate groups originate from isomers of MDI, 0.1 to 5 wt.-% of additives, the sum of components being intended to amount to 100%. In particularly preferred embodiment, the two-component polyurethane matrix should contain no amine-containing components.

In a preferred embodiment the cured thermosetting two-component polyurethane matrix preferably has a glass transition temperature (Tg) of above 60° C. (measured by DSC, DIN 11357), more preferably from 100 to 130° C. and a modulus of elasticity of more than 1000 MPa at temperatures of between −10° C. and +70° C. (in line with DIN EN ISO 527).

The present invention also provides a method for the manufacture of fiber-reinforced composites comprising the steps:

1) providing an external mold comprising the composition, which comprises the fiber material and the thermoplastic binder (preform);

2) introducing the two-component polyurethane matrix resin into said mold under pressure and/or vacuum; and 3) curing said composition at a temperature of up to 140° C., preferably from 60 to 120° C.

The method for manufacture of fiber-reinforced composites comprises injection and infusion methods or combinations thereof. In particular, the method according to the invention comprises two embodiments. Inflow may be carried out rapidly by injection under pressure (Resin Transfer Molding or also RTM method), optionally also with vacuum assistance (VARTM). The preferred two-component polyurethane matrix resins employed in the RTM method have a short open time, but thereafter exhibit a rapid reaction. In another embodiment the mold is filled by application of a vacuum (infusion method). In this embodiment, a long open time is advantageous. Preferably, the viscosity of the two-component polyurethane matrix resin is low and may increase only slightly under the method conditions of mold filling. Care must be taken to ensure that the flow rate is selected such that air or gases can escape from between the fiber materials.

In case of the infusion method, a long open time is preferred, for which reason the two-component polyurethane matrix resin should preferably contain no catalysts. Alternatively, retarded or temperature activated catalysts can be used. Inflow onto the fiber materials, displacement of air bubbles and mold filling may be carried out over an extended period. Due to the slow progress of the reaction, the fiber materials can be completely embedded in the matrix material.

In case of the RTM method, mold filling proceeds in a short time. The two-component polyurethane matrix resin is introduced into the mold under pressure. The low initial viscosity ensures that the fibers are rapidly embedded. In this embodiment, the compositions preferably also contain catalysts. After a short time, the latter accelerate the reaction and curing therefore proceeds rapidly. This may also be assisted by an elevated temperature. A short residence time in the mold is then possible.

Since a crosslinking reaction begins after mixing, it is convenient either for only the required quantities of the two-component polyurethane matrix resin mixture to be produced and directly processed or, in another approach, the two-component polyurethane matrix resin is produced continuously and introduced into the mold.

Once the mold has been filled, the two-component polyurethane matrix resin begins to cure. This may proceed without additional heat. The heat of reaction arising from the crosslinking reaction does not result in localized overheating of the substrates. The filled mold may be heated in order to accelerate the crosslinking reaction. It may be heated to temperatures of up to 140° C., preferably 60 to 120° C., so ensuring faster crosslinking of the two-component polyurethane matrix resin. The mold can thus be removed sooner from the molded part and is then available for further working operations.

The composition comprising a fiber material and a thermoplastic binder according to the invention are particularly suitable to be embedded by the two-component polyurethane matrix resin, for example by means of the infusion method or the RTM method. Acceleration of curing may be achieved by targeted temperature control of the method and not necessarily by the choice of the two-component polyurethane matrix resin. Due the composition of the invention, a fiber-reinforced composite can be produced, which shows less defects and an improved mechanical strength.

The composition according to the present invention and the fiber-reinforced composite according to the present invention can be used in railway vehicles, automotive vehicles, aircraft vehicles, boats, space vehicles, motorbikes, bicycles, sporting goods, e.g., skis, snowboards, rackets, golf clubs, fishing rods, baseball bats, hockey sticks, arrows, archery bows, surfboards, javelines, exercise equipment, helmets, functional clothing, shoes, construction parts in bridges and buildings or wind turbine blades.

EXAMPLE SECTION

The following measurement methods are employed in the present invention if not explicitly stated otherwise.

Preparation of the Compositions Comprising a Fiber Material and a Thermoplastic Binder
Preactivation:

The binder is molten and sprayed or powder coated with a weight of 10 g/m² onto fiber mats (unidirectional glass fiber "UD Glasgelege, Saertex S15EU920, 1012 g/m2"), namely onto that side of the fiber mat on which sutures are present. For fixation of the binder a preactivation step is performed by tempering the binder-impregnated fiber mats at 90° C. for 30 min in a heat oven.
Test for Rewindability:

Directly after its preactivation a first binder-impregnated fiber mat (12 cm×12 cm) is brought into contact with a second binder-free fiber-mat (12 cm×12 cm), in such a way that the binder-impregnated side of the first fiber mat is placed onto that side of the second fiber mat, on which the sutures were visible. The fiber mats were weight down by a metal plate (load of 2.6 kg) and tempered for 17 h at elevated temperature (either 40° C. or 60° C.). After cooling to room temperature the adhesion between these two fiber mats is tested.

Test for Reactivation:

Directly after its preactivation a first binder-impregnated fiber mat (12 cm×12 cm) is brought into contact with a second binder-free fiber-mat (12 cm×12 cm), in such a way that the binder-impregnated side of the first fiber mat is placed onto that side of the second fiber mat, on which the sutures were visible. The fiber mats were weight down by a metal plate (load of 2.6 kg) and tempered for 30 min at 130° C. (consolidation step). After cooling to room temperature the adhesion between these two fiber mats is tested.

This procedure is repeated with a first binder-impregnated fiber mat which has been stored after preactivation for 14 d at room temperature before it is brought into contact with a second binder-free fiber-mat.

The differences in adhesion after the consolidation step are compared between the sample based on the binder-impregnated fiber mat, that has been stored for 14 d at room temperature, and the sample based on the freshly-preactivated fiber mat. The smaller the difference in adhesion, the better the storability/reactivation.

Test for Stiffness: Two fiber mats (unidirectional glass fiber "UD Glasgelege, Saertex S15EU920, 1012 g/m2") are cut into size (35 cm perpendicular to the fiber direction×32 cm parallel to the fiber direction). The binder is molten and sprayed or powder coated with a weight of 10 g/m² onto one of the fiber mats, namely onto that side of the fiber mat on which sutures are visible. This mat is brought into contact with the second binder-free fiber-mat, in such a way that the binder-impregnated side of the first fiber mat is placed onto that side of the second fiber mat, on which the sutures are visible. The mats are cut in 5 pieces (6 cm perpendicular to the fiber direction×32 cm parallel to the fiber direction). Each specimen is placed in a curved mould and heated to 140° C. for 30 min. After cooling down to room temperature the tensile modulus is evaluated with a Zwick Z010 Zwick Materials Testing Machine according to DIN EN ISO 527-1 (fixture 1 kN; force transducer: 500 N; testing speed: 10 mm/min; speed elastic modulus: 10 mm/min) to give a measure for the stiffness.

Melting Point and Tg

This is determined using a micro-balance capable of measuring to ±0.01 mg and a Mettler Toledo TA Instruments Q100/Q1000 DSC unit. The DSC is calibrated using an Indium standard. 10 to 15 mg of sample is weighed into an aluminum DSC pan and the lid fixed securely. The temperature of the DSC chamber is set at 40° C. prior to use. The sample pan and reference pan (blank) is placed into the DSC cell chamber. The temperature is reduced to −50° C. at a cooling rate of 15° C. per minute. The temperature is held at −50° C. and then increased to 150° C. at a heating rate of 5° C. per minute. The Tg is obtained from an inflection in the heat flow whereas Tm is obtained from an endothermic peak in the heat flow.

Molecular Weight Determination

The respective compounds/compositions is analyzed for molecular weight and molar mass distribution by Gel Permeation Chromatography (GPC) under the same chromatographic condition. Test samples are dissolved in N,N-dimethylacetamide and each of the prepared sample solutions is filtered through a 0.20 □m syringe filter into analysis vial. The prepared sample solutions is analyzed by liquid chromatography using a GPC separation technique using Styragel columns with N,N-dimethylacetamide/LiCl elution and refractive index detection at 80° C. The number average molecular weight ($M_n$) and weight average molecular weight ($M_w$) that is determined for the tested substances is based on an external calibration that is carried out with polystyrene standards.

Melt Viscosity

Melt viscosity was measured using a Brookfield Viscometer model RVDV-1+ with a Model 106 temperature controller and Thermosel unit, calibrated with viscosity standard oil. 10 to 12 g of adhesive is weighed into a disposable aluminum viscometer tube. The tube is inserted into the Viscometer and left to equilibrate for 30 minutes at 160° C. The preheated spindle no. 27 is inserted into the adhesive and allowed to rotate for 30 minutes at 160° C.; the speed of rotation is changed according to the viscosity range measured. The initial viscosity V1 at 160° C. is then measured.

Experiments

Binders:

TPU1 (Inventive Example)

NCO:OH=0.77:1

| | |
|---|---|
| A1 | 22.1% |
| B1 | 9.9% |
| B2 | 19.4% |
| B3 | 33.1% |
| 4,4'-MDI | 15.0% |
| Evernox 10 | 0.5% |

Semi-crystalline polyester A1, Dynacoll 7330 (Evonik), crystalline copolymer, $M_n$=3910 g per mole, Tm=85° C.

Non-crystalline polyester B1, copolymer of diethylene glycol, adipic acid and isophthalic acid, $M_n$=1930 g per mole, Tg=−25° C.

Non-crystalline polyester B2, copolymer of ethylene glycol, neopentyl glycol, sebacic acid and isophthalic acid, $M_n$=1875 g per mole, Tg=−25° C.

Non-crystalline Polyester B3, Stepanpol PD-195 (Stepan), copolymer of diethylene glycol and phthalic anhydride, $M_n$=585 g per mole 4,4'-MDI, 4,4'diphenyl methane diisocyanate Evernox 10, antioxidant Polyester polyols and Evernox 10 were weighed into a glass flask and heated to 120° C. with mechanical stirring. The flask was sealed and vacuum was applied for 1 hour (pressure 2-5 mbar) via a vacuum pump to remove water. Flake MDI was added and allowed to react with the hydroxyl groups at 130° C. The reaction was followed by infra-red spectroscopy until the NCO absorption at 2200 cm$^{-1}$ disappeared.

TPU2

| | |
|---|---|
| Polyester B4 | 53.3% |
| Irganox 1010 | 0.5% |
| Voranol 3055 | 5.4% |
| 4,4'-MDI | 33.4% |
| 1,2-propane diol | 7.4% |

Non-crystalline polyester B4, Tg=−55° C. and $M_n$=865 g/mol.

Voranol 3055, polyether triol

Irganox 1010, antioxidant

Polyester polyol, polyether polyol and antioxidant were placed in a round bottomed flange flask and heated to 80° C. under nitrogen. Vacuum was applied for 60 minutes (pressure about 0 mbar) to remove water. MDI was added under nitrogen and an exothermic reaction was observed (from about 80° C. to about 125° C.), and subsequently the oil bath temperature was increased to 110° C. The NCO content was determined by titration. NCO/OH in the first step 2/1. The diol was added after the theoretical calculated NCO value had been reached, an exothermic reaction was observed (from about 110° C. to about 145° C.) and the oil bath temperature was increased to 140° C. The NCO/OH ratio in the second step was 0.685/1. After 3 hours, the isocyanate content was remeasured as <0.05%. Vacuum was applied for 60 minutes (pressure about 0 mbar) to degas the mixture.

Commercial binder Epikote 5390 (Thermoplastic) (non-inventive example)

Commercial binder Epikote 620 (Thermoset) (non-inventive example)

TABLE

| | TPU 1 | TPU 2 | Epikote 620 | Epikote 5390 |
|---|---|---|---|---|
| Rewindability | Very good (low adhesion) | Poor (strong adhesion) | Very good (low adhesion) | Good (slight adhesion) |
| Stiffness | Very good (modulus > 0.5 MPa) | Very good (modulus > 0.5 MPa) | Very good (modulus > 0.5 MPa) | Mediocre (modulus < 0.2 MPa) |
| Reactivation | Very good (strong adhesion, just slight drop) | Very good (strong adhesion, just slight drop) | Mediocre (very low adhesion, significant drop) | Good (low adhesion, drop from low starting point) |

Fiber-Reinforced Composites:

Two-Component Polyurethane Matrix Resin:

42 g of polyol (I) (polyethertriol; hydroxyl value=550 mg KOH/g; viscosity=1800 mPas (Brookfield 25° C., spindle no. 4, 20 rpm); hydroxyl equivalent weight=102 g, number average molecular weight=300 g/mol) and 56 g of polyisocyanate (II) (mixture of MDI isomers and oligomeric/polymeric MDI, NCO content 32 wt.-%, viscosity=43 mPas (Brookfield 25° C., spindle no. 3, 50 rpm)) are mixed and stirred for 1 min at 800 rpm, 30 s at 1250 UpM and finally 20 s at 150 UpM under vacuum (50 mbar).

Preform:

Two fiber mats (unidirectional glass fiber "UD Glasgelege, Saertex S15EU920, 1012 g/m2") are cut into size (50 cm×50 cm). The binder is applied with a weight of 10 g/m2 onto one of the fiber mats, namely onto that side of the fiber mat on which sutures are visible. This mat is brought into contact with the second binder-free fiber-mat, in such a way that the binder-impregnated side of the first fiber mat is placed onto that side of the second fiber mat, on which the sutures are visible. The mats are tempered for 30 min at 130° C.

Fiber-Reinforced Composite:

The preform is placed into a mould (50 cm×50 cm×4 mm). The two-component polyurethane matrix resin is introduced into the mold using an Isojet RTM Machine via VARTM procedure. Afterwards the composition is cured at 100° C.

The invention claimed is:

1. A fiber preform for embedding in a two-component polyurethane matrix resin to form a fiber-reinforced composite, wherein the fiber preform includes a fiber material comprising one or more fibers, the fibers held together by a binder, wherein the binder comprises at least one thermoplastic, hot melt polyurethane polymer adhesive (A) that is essentially free of reactive isocyanate groups; wherein said thermoplastic, hot melt polyurethane polymer adhesive (A) comprises a reaction product of
(i) at least one polyester polyol;
(ii) at least one polyisocyanate; and
(iii) optionally at least one diol which is different from the at least one polyester polyol (i);
wherein the molar ratio of the NCO groups of said polyisocyanate (ii) to the sum of OH groups of said polyester polyol (i) and said optionally containing diol (iii) is less than 1.00:1; and
wherein said polyester polyol (i) comprises
(a) at least one semi-crystalline polyester polyol having a melting point ($T_m$) of from 40 to 180° C.; and
(b) at least one non-crystalline polyester polyol.

2. The fiber preform according to claim 1, wherein the at least one non-crystalline polyester polyol (b) comprises
(b1) a non-crystalline polyester polyol having a number average molecular weight ($M_n$) of less than 750 g/mol; and
(b2) a non-crystalline polyester polyol having a number average molecular weight ($M_n$) of at least 750 g/mol.

3. The fiber preform according to claim 1, wherein the at least one thermoplastic, hot melt polyurethane polymer adhesive (A) has a number average molecular weight ($M_n$) of from 5,000 to 80,000 g/mol.

4. The fiber preform according to claim 1, wherein the at least one polyester polyol (i) which an ortho-phthalate.

5. The fiber preform according to claim 1, wherein the at least one thermoplastic, hot melt polyurethane polymer adhesive (A) comprises a first thermoplastic polyurethane polymer (A1) and a second thermoplastic polyurethane polymer (A2),
wherein the first thermoplastic polyurethane polymer (A1) has a number average molecular weight ($M_n$) of less than 25,000 g/mol;
wherein the second thermoplastic polyurethane polymer (A2) has a number average molecular weight ($M_n$) of at least 25,000 g/mol; and
wherein the weight ratio of (A1) to (A2) is 5:95 to 95:5.

6. The fiber preform according to claim 1, wherein the at least one diol (iii) was present in the reaction and the at least one diol (iii) comprises at least a primary and a secondary OH group and/or wherein the at least one diol (iii) comprises at least two primary OH groups.

7. The fiber preform according to claim 1, wherein the binder comprises 50 to 99.9 wt.-% of the at least one thermoplastic, hot melt polyurethane polymer adhesive (A); and 0.1 to 50 wt.-% of additives, based on the total weight of the said binder.

8. The fiber preform according to claim 7, wherein the additives comprise stabilizers, adhesion promoters, tackifiers, fillers, plasticizers and further thermoplastic polymers which are different from the at least one thermoplastic, hot melt polyurethane polymer adhesive (A), or a combination thereof.

9. The fiber preform according to claim 1, wherein the fiber material contains fibers selected from the group consisting of glass fibers, synthetic fibers, carbon fibers, boron fibers, ceramic fibers, metal fibers, natural fibers, and combinations thereof.

10. The fiber preform according to claim 1, in the form of a mat, woven fabric, nonwoven fabric, non-crimped fabric, knitted fabric, plies, or roving.

11. An article comprising the fiber preform of claim 1.

12. A railway vehicle, automotive vehicle, aircraft vehicle, boat, space vehicle, motorbike, bicycle, sporting good, helmet, functional clothing, shoe, construction part or wind turbine component, comprising the fiber preform of claim 1.

13. A fiber-reinforced composite comprising the fiber preform of claim 1 embedded in cured reaction products of a thermosetting polyurethane polymer, wherein the fiber-reinforced composite comprises more than 30% of the fiber preform of claim 1 by volume based on the total volume of said fiber-reinforced composite.

14. The fiber-reinforced composite according to claim 13, wherein the thermosetting polyurethane polymer is a two-component thermosetting polyurethane resin comprising:
at least one polyol (I) having a number average molecular weight ($M_n$) of less than 3,000 g/mol;
at least one polyisocyanate (II);
wherein the molar ratio of the OH groups of said polyol (I) to the NCO groups of said polyisocyanate (II) is from 2:1 to 1:10.

15. The fiber-reinforced composite according to claim 13, wherein the thermosetting polyurethane polymer is a two-component polyurethane matrix resin comprising:
at least one polyol (I) having a number average molecular weight ($M_n$) of less than 3,000 g/mol;
at least one polyisocyanate (H);
wherein the molar ratio of the OH groups of said polyol (I) to the NCO groups of said polyisocyanate (II) is from 2:1 to 1:5.

16. The fiber-reinforced composite according to claim 13, wherein the thermosetting polyurethane polymer is a two-component polyurethane matrix resin comprising:
at least one polyol (I) having a number average molecular weight ($M_n$) of less than 3,000 g/mol;
at least one polyisocyanate (II);
wherein the molar ratio of the OH groups of said polyol (I) to the NCO groups of said polyisocyanate (II) is from 2:1 to 1:2.

17. An article comprising the fiber-reinforced composite of claim 13.

18. A railway vehicle, automotive vehicle, aircraft vehicle, boat, space vehicle, motorbike, bicycle, sporting good, helmet, functional clothing, shoe, construction part or wind turbine component, comprising the fiber-reinforced composite of claim 13.

19. A method for the manufacture of fiber-reinforced composites comprising the steps:
1) providing an external mold;
2) disposing the fiber preform of claim 1 within the mold;
3) introducing a mixture of a two-component thermosetting polyurethane resin comprising:
at least one polyol (I) having a number average molecular weight ($M_n$) of less than 3,000 g/mol; and
at least one polyisocyanate (II);
wherein the molar ratio of the OH groups of said polyol (I) to the NCO groups of said polyisocyanate (II) is from 2:1 to 1:10 into said mold under pressure and/or vacuum; and
4) curing said mixture at a temperature of up to 140° C.

* * * * *

UNITED STATES PATENT AND TRADEMARK OFFICE
CERTIFICATE OF CORRECTION

PATENT NO. : 10,526,460 B2
APPLICATION NO. : 15/465966
DATED : January 7, 2020
INVENTOR(S) : Andreas Ferencz et al.

Page 1 of 1

It is certified that error appears in the above-identified patent and that said Letters Patent is hereby corrected as shown below:

In the Claims

Column 20, Line 28: Change "(H)" to -- (II) --.

Signed and Sealed this
Eleventh Day of August, 2020

Andrei Iancu
*Director of the United States Patent and Trademark Office*